United States Patent [19]

Kraus

[11] 4,203,059

[45] May 13, 1980

[54] ELECTRONIC CURRENT SENSOR AND CONTROLLER FOR AUTOMATIC POWER ANTENNA

[75] Inventor: Richard A. Kraus, Berkley, Mich.

[73] Assignee: Chrysler Corporation, Highland Park, Mich.

[21] Appl. No.: 902,473

[22] Filed: May 3, 1978

Related U.S. Application Data

[63] Continuation of Ser. No. 780,380, Mar. 23, 1977, abandoned.

[51] Int. Cl.² .............................................. H02P 1/18
[52] U.S. Cl. .................................. 318/446; 318/479; 307/140
[58] Field of Search ............... 318/101, 103, 112, 266, 318/267, 446, 466, 468, 478, 479; 307/10 R, 130, 131, 140; 361/187

[56] References Cited

U.S. PATENT DOCUMENTS

| | | | |
|---|---|---|---|
| 2,949,608 | 8/1960 | Fischer | 318/466 |
| 3,603,846 | 9/1971 | Toth | 361/187 |
| 4,126,820 | 11/1978 | Hörmann et al. | 318/468 |

OTHER PUBLICATIONS

Operational Amplifiers (Design and Applications), ®1971 by Burr-Brown Research Corp., McGraw-Hill Book Co., sections 6.7–6.10.

*Primary Examiner*—Gene Z. Rubinson
*Attorney, Agent, or Firm*—Baldwin & Newtson

[57] ABSTRACT

An electronic current sensor and controller for automatically controlling the extension and retraction of a power antenna with the energization and de-energization of an automobile radio receiver.

18 Claims, 1 Drawing Figure

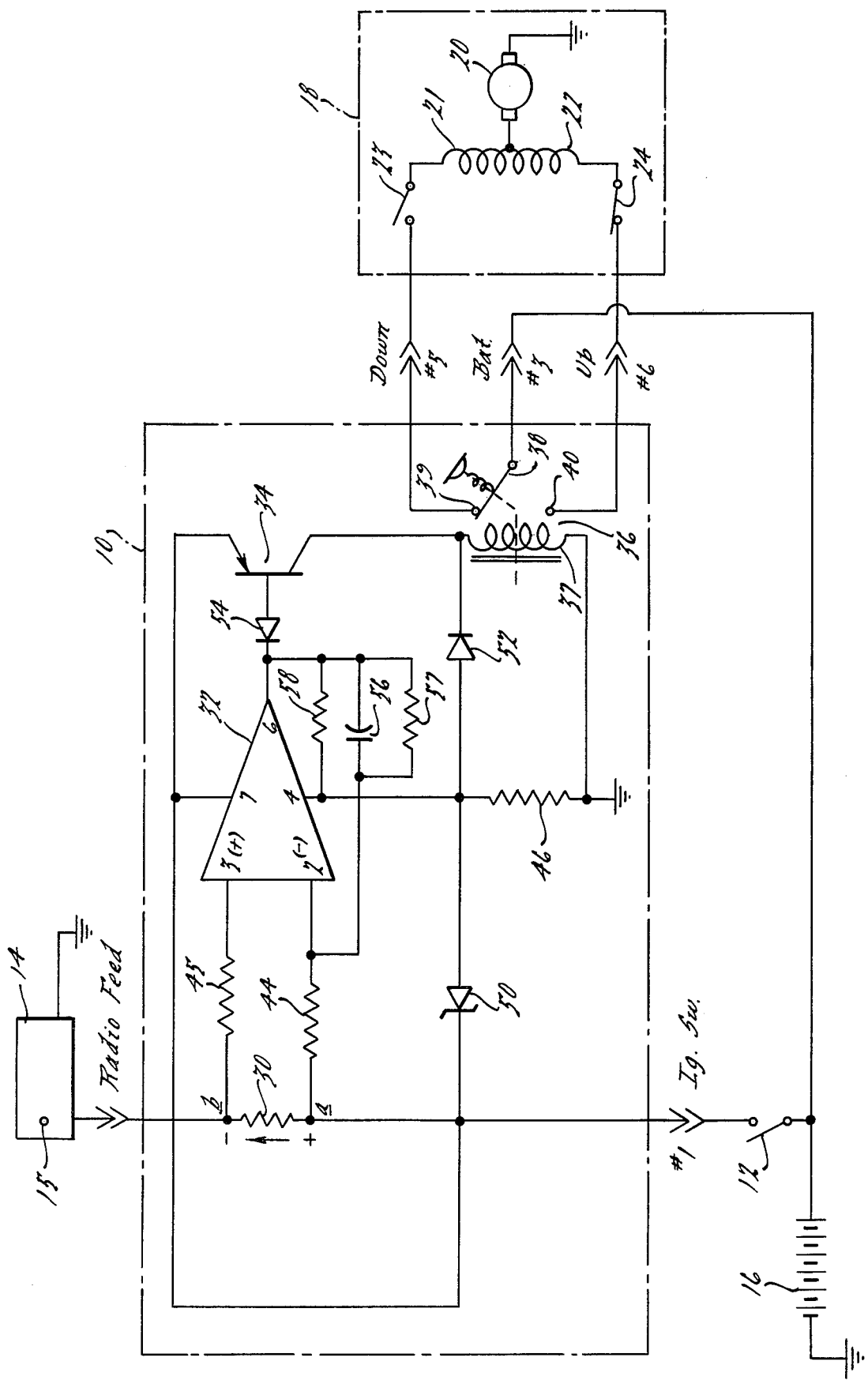

ELECTRONIC CURRENT SENSOR AND CONTROLLER FOR AUTOMATIC POWER ANTENNA

This is a continuation of application Ser. No. 780,380, filed Mar. 23, 1977 and now abandoned.

BACKGROUND

This invention relates to an electronic current sensor and controller for sensing the energization of a load or first electrical utilization device and controlling the operation of a second utilization device remotely located from the first device. More particularly, the invention relates to a current sensor or monitor device for controlling the application of a relatively high level of current to an electrical utilization device from the remote sensing of a relatively low level of current supplied to another electrical utilization device. The invention has various applications in automotive vehicles, such as for an automatic power antenna device which control the extension and retraction of an electric motor driven antenna with the energization and de-energization of the automobile radio receiver.

The controller, which does not require any internal connection to nor any modification of the radio receiver utilization device, provides reliable operation of a control relay from an activating signal voltage as low as ten millivolts developed across a current sensor resistor connected between the vehicle ignition switch and the B+ supply terminal of the receiver, and does not, by reason of its presence, affect or degrade the performance and operation of the receiver. In addition to its aforementioned advantageous characteristics, the controller, which is composed of inexpensive electronic and electrical components, features novel suppression circuits for protection of the electronic components thereof from the otherwise damaging effects of high voltage transients presented to the controller upon the de-energization of various electrical loads in the vehicle and from the inductive components of the controller itself.

The above and other objects, features and advantages of the invention, together with the structural composition and functional operation thereof, will appear from consideration of the following detailed description of the preferred embodiment of the invention made with reference to the accompanying schematic electrical circuit shown in the single figure of the drawings in which the controller 10 is shown as a five terminal, case-grounded structure.

Terminals #1 and #2 constitute the input terminals of the controller and are respectively connected to the load side of the battery-fed vehicle ignition switch 12 and to the B+ radio feed or main supply terminal of the radio receiver which is shown at 14 as having a chassis ground return to the other or negatively grounded side of the vehicle battery 16. Terminals #3, #5, and #6 constitute the output or the switching terminals of the controller of which terminal #3 is connected to the positive side or high potential terminal of the vehicle battery 16, and terminals #5 and #6 are respectively connected to the "down" and "up" terminals of the reversible motor driven power extensible and retractable antenna unit shown at 18.

The unit 18 is a commercially available antenna unit as manufactured by the Tenna Corporation of Cleveland, Ohio, for example, and includes a D.C. drive motor 20 having a "down" field winding 21 and an "up" field winding 22. Windings 21 and 22 are respectively connected to the "down" and "up" input terminals of the unit 18 through antenna position responsive or activated internal limit switches 23 and 24 of which switch 23 is open and switch 24 is closed when the antenna is fully retracted and visa versa when the antenna is fully extended.

Internally, the controller 10 comprises basically a current sensor 30, an operational amplifier 32, an output switching control or relay driver transistor 34 and a control relay 36 having a relay coil 37, which operates a set of normally closed 38, 39 and a set of normally open 38, 40 switch contacts. The relay is depicted in its de-energized condition with its contacts in the position shown in which the directly battery fed output terminal #3 of the controller is connected through the movable relay contact 38 to the back contact 39 of the relay and then to the "down" output terminal #5 of the controller, which is connected to the "down" field coil 21 through limit switch 23 of the motorized antenna unit 18.

The current sensor 30 is a resistor of low ohmic value, say 0.25 ohms having a 5 watt power rating, and is connected from its opposite sides or ends, labelled a, b, through resistors 44 and 45 to the inverting ($-$) and to the non-inverting ($+$) signal input terminals, constituted by pins #2 and #3, respectively, of the operational amplifier 32. The latter is a low cost, high gain differential operational amplifier, such as the general purpose type LM107 series commercially available from various manufacturers as Signetics Corporation, RCA or Texas Instruments, for example.

Such operational amplifiers are characterized by input configurations which can operate at signal levels at or near the operating supply voltage level of the amplifier and still provide an adequate amount of gain for signals differing by a few millivolts in level applied to the input terminals thereof. The input and output transistors of the LM107 series have their collector electrodes directly connected to and are at the B+ operating supply level. Pins #7 and #4 are the operating potential terminals of the amplifier of which Pin #7 is connected internally of the controller to the controller input terminal #1 adjacent the side a of the sensor resistor 30. Pin #4 is connected to case ground through a resistor 46 having a resistance value of, say 1000 ohms. Pin #6 is the signal output terminal of the amplifier and is nearly at the potential level of the operating voltage supply under short circuited input or for a zero input voltage applied across its input terminals.

The ungrounded side of resistor 46 is connected to the anode of a Zener diode 50 whose cathode is connected between input terminal #1 of the controller and the side a of the sensor resistor 30. The ungrounded side of the resistor 46 is also connected through another diode 52 poled as shown to the collector electrode of the relay driver or output control transistor 34.

In accordance with the one aspect of the invention, the resistor 46, Zener diode 50, and diode 52 form a transient suppression circuit for protection of the operational amplifier 32 and the switching transistor 34 from the damaging effects of high voltage transients encountered on and presented to the current sensing line. Such transients may easily attain peak values in excess of 80 volts or so and are generated from various sources upon the de-energization of various electrical loads, as the air conditioner clutch, heater or blower motor, electrical windshield wipers, etc., while the engine is running. In the absence of proper suppression techniques or resort to expensive solid state components of special design to withstand such transients, the orindary components employed herein would be destroyed.

The Zener diode 50 is a general purpose low cost Zener diode such as a type 1N4749 or equivalent component having a 24 volt, 1 watt rating and has its cathode connected essentially to the pin terminals 2 (3) and 7 of the OP AMP 32 and to the emitter of the transistor 34. The anode of the Zener diode is connected to the return terminal pin #4 of the OP-AMP. Thus, with an 80 volt positive going transient spike on the sensor line, the 24 v. Zener will break down to prevent the voltage between any of these points from exceeding 24 volts irrespective of the transient peak magnitude, and thus protects these components from breakdown. The 56 v. balance of the assumed 80 v. transient will be dropped across the current limiting resistor 46, in the absence of which the otherwise unlimited current through the Zener would destroy the Zener diode. It will be noted that there is an additional current path in parallel with the resistor 46 through the diode 52 and the relay coil 37 to ground. This circuit places the collector of the transistor at 55.4 volts due to the assumed 80 v. transient and limits the voltage across the output electrodes of the transistor to the 24 volt regulation level of the Zener, thereby affording similar circuit protection to the driver transistor for substantially all transients presented on the current sensing line.

It will be also noted that the relay coil 39 is connected across diode 52 and resistor 46. In this aspect, diode 52 serves to protect the output transistor 34 from the high inductive voltage surges generated upon de-energization of the relay coil 36 in addition to its function or cooperation with Zener diode 50 and resistor 46 to limit the voltage across the output transistor due to high voltage transients on the current sensing line.

Control transistor 34 may be a PNP general purpose transistor such as of the 2N4402 or equivalent variety, having emitter, base and collector electrodes of which the emitter electrode is connected with pin #7 of the operational amplifier 32 to the B+ supply voltage at the input terminal #1 of the controller and the collector electrode 34 is connected to the high potential or ungrounded side of the relay coil 36. The base electrode of the transistor is connected to the output terminal or pin #6 of the operational amplifier through another diode 54, which is poled as shown and provides an additional diode drop in the emitter base circuit path of the transistor to assure turn-off of the control transistor from the operational amplifier. Diodes 52 and 54 are low signal level, general purpose, low cost diodes such as type 1N4148 or equivalent.

The remaining components of the controller include the filter capacitor 56 and resistors 57 and 58 all of which are connected at one side to output pin #6 of the OP-AMP 32. Capacitor 56, which has a capacitance value of 0.033 ufd and resistor 57 are connected at their other side of the inverting (−) input terminal of the amplifier, while the other side of resistor 58 is connected to the return supply terminal pin #4 of the amplifier, as shown. Resistor 57 in conjunction with resistor 44 sets the closed loop gain of the amplifier 32 in accordance with the ratio of R57 to R44 having illustrative resistance values of 3 megohms and 10,000 ohms, respectively. Resistor 45 also has a value of 10,000 ohms and serves to balance the amplifier for the input bias currents, which are drawn by the transistors located internally thereof and are connected to the respective input terminals or pins 2 and 3 thereof. Resistor 58 has a resistance of 22,000 ohms and serves to reduce an undesired oscillatory condition encountered on turn on of the controller and tending to cause relay chatter. Capacitor C1 likewise prevents actuation of the relay from short transients on the current sensing line and reduces the reaction of the circuit to such transient noise by slowing the response of the circuit.

In describing the operation of the device, it will be assumed that the antenna is in its down or fully retracted position, that the ignition switch 12 is closed or ON, and that the radio 14 is OFF and is not drawing current from the potential source 16. The voltage level at the opposite sides a,b of the sensor resistor 30 will be equal and the voltage drop thereacross will be zero, so that a zero difference input signal is presented to the operational amplifier 32. The output terminal #6 of the operational amplifier will thus be at a high potential at or near the 12 volt level of the "rail" or pin #7 thereof. Diode 54 will be back-biased and prevent base current draw for transistor 34, which will therefore be OFF to prevent energization of the coil 37 of the relay 36 whose contacts will be in the position shown.

When the radio receiver load is turned ON, as by the ON-OFF power control switch 15 customarily provided on the audio volume control of the radio receiver, the latter will draw from the battery 16 through the sensor resistor 30 a current of a magnitude depending upon the setting of the gain attenuating or volume control. The controller is designed to respond to a minimum current draw of 40 milliamperes for most radio receivers and will develop a corresponding voltage drop in the direction of the arrow across the 0.25 ohm sensor resistor 30. The potential at point b of the sensor resistor will be at least 10 millivolts below the level at point a and of a sufficient level to operate the operational amplifier, while being of insignificant consequence to the 12 V. supply potential of the radio feed line to the receiver so as to present no effect upon the performance of operation of the latter due to the presence of the sensor resistor.

The signal voltage developed across the sensor resistor for the minimum current draw of the receiver is of such direction and magnitude and the gain of the OP-AMP is such as to cause the voltage level at output terminal pin #6 thereof to drop sufficiently to forward bias diode 54 and provide a base current path to turn on transistor 34 through pin #6 and #4 of the operational amplifier and through resistor 46 to ground. With transistor 34 turned on, current is supplied from B+ through the emitter and collector output electrodes of the transistor to the relay coil 37, which will then transfer its movable contact 38 from the position shown to front contact 40. This connects the battery fed output terminal #3 of the controller to the "up" terminal #6 thereof, which is connected to the "up" field coil 22 of the drive motor 20 of the power antenna unit 18 through the closed limit switch 24 and thereby energize the motor to extend the antenna until the limit switch 24 opens to de-energize the drive motor. So long as the radio receiver 14 remains energized with the ON-OFF control 15 in the ON position and the ignition switch 12 is ON, the relay coil 37 remains energized and its contacts remain in the opposite position from that shown.

When the receiver 14 is turned OFF, as by turning off the ON-OFF control switch 15 thereof while the ignition switch 12 is still on, the voltage level at side b of the sensor resistor 30 goes up to attain the level at side a thereof, whereby the output of the operational amplifier at pin #6 goes up to back bias diode 54 and interrupt the base current drive for the transistor 34. Transistor 34 thus turns off to de-energize the relay coil 37 which transfers its contacts back to the position shown. The battery fed terminal #3 is switched to the back contact 39 of the relay connected to the "down" or #5 terminal of the controller, which is connected to the "down" field coil 21 of the antenna drive unit 18. This energizes the "down" field coil of the reversible drive motor 20 through the limit switch 23, which is closed when the antenna is in an extended position, and the motor is energized to rotate in the opposite direction and retract the antenna until such point as the limit switch 23 is opened and switch 24 is closed.

It will be appreciated that the same sequence of operations will take place with the radio receiver control 15 left in the ON position and the receiver energized and de-energized with the opening and closing of the ignition switch 12, the opening of which will remove the operating potential for the amplifier 32 and the transistor 34, which drops out the relay.

What is claimed is:

1. A solid state electronic current sensor and controller circuit for sensing the energization of an automobile radio receiver device electrically powered from a potential source and for controlling an extensible and retractable power driven antenna unit remotely located from said receiver device upon energization and deenergization of the receiver device, said current sensor and controller comprising
    a first resistor adapted to be connected in series between one side of said potential source and said receiver device;
    a high gain, differential operational amplifier having a pair of signal input terminals connected across said first resistor, a signal output terminal and a pair of operating potential supply terminals including a high potential supply terminal and a supply return terminal of which the high potential terminal is connected to one side of said first resistor adjacent said source;
    an electrical relay having a coil and a set of switch contacts for connection to said power driven antenna unit to control the extension and retraction thereof upon energization and deenergization of said relay;
    an output control transistor having an input control electrode coupled to the output terminal of said amplifier and a pair of output electrodes one of which is connected to the high potential supply terminal of said amplifier and the other to one side of said relay coil in current controlling energization relation with said relay coil; and
    a suppression circuit for protection of the operational amplifier and said control transistor from high voltage transients presented to the input of the controller including,
    a Zener diode connected between the said return supply terminal of said operational amplifier and the side of said first resistor connected to the said one side of said potential source and
    a second resistor connected to the return supply terminal of the amplifier and the other side of said relay coil returned to the other side of said potential source.

2. A solid state current sensor and controller circuit in accordance with claim 1 including a diode connected between the control electrode of said output control transistor and the output terminal of said amplifier and poled to permit base current drive for said control transistor to flow through said amplifier and said second resistor when a signal voltage, which is developed across said first resistor upon the energization of said first automobile radio receiver device, is presented to said operational amplifier.

3. A solid state current sensor and controller in accordance with claim 1 including a third diode connected across the relay coil.

4. A solid state current sensor and controller in accordance with claim 1 wherein said Zener diode has a voltage rating at least equal to the potential of said source.

5. A solid state current sensor and controller in accordance with claim 1 including a capacitor connected between the output terminal of said amplifier and one of the input terminals thereof.

6. A solid state current sensor and controller in accordance with claim 1 including a third resistor and a fourth resistor for setting the gain of the operational amplifier of which the third resistor is connected between the said one of the input terminals of the operational amplifier and one side of the first resistor and the fourth resistor is connected between the output terminal of the operational amplifier and the said one input terminal thereof.

7. A solid state current sensor and controller in accordance with claim 6 wherein the said one of the input terminals of the operational amplifier is the inverting input terminal thereof.

8. A solid state current sensor and controller in accordance with claim 6 including a capacitor connected in parallel with said fourth resistor.

9. A solid state sensor and controller in accordance with claim 8 including a fifth resistor connected between the output terminal and the supply return terminal of the amplifier.

10. A solid state sensor and controller in accordance with claim 9 including a sixth resistor connected from the other side of said first resistor to the other input terminal of said operational amplifier.

11. A solid state current sensor and controller in accordance with claim 1 wherein said power driven antenna unit includes a reversible electrical motor selectively energizable through an up field winding and a down field winding wherein said relay contacts are adapted to connect said potential source to one of the field windings in one condition of energization of the relay coil and to the other field winding in the other condition of the relay coil.

12. A solid state electronic current sensor and controller circuit for sensing the energization of an automobile radio receiver device electrically powered from a potential source and for controlling the extension and retraction of a power drive antenna unit remotely located from said receiver device upon energization and de-energization of the receiver device, said power driven antenna unit including a reversible electrical motor selectively energizable through an up field winding and a down field winding; said current sensor and controller comprising a first resistor adapted to be connected in series between one side of said potential source and said receiver device;

a high gain, differential operational amplifier having a pair of signal input terminals connected across said first resistor, a signal output terminal, and a pair of operating potential supply terminals for receiving operating potential for said amplifier from said potential source;

an electrical relay having a coil and a set of switch contacts for connection to said power driven antenna unit to control the extension and retraction thereof upon energization and deenergization of said relay;

an output control transistor having an input control electrode coupled to the output terminal of said operational amplifier and a pair of output electrodes one of which output electrodes is connected to the high potential supply terminal of said operational amplifier and the other of which output electrodes is connected to one side of said relay coil whose other side is adapted to be returned to the other side of said potential source;

said potential source connectable through said relay switch contacts to said up field winding of said reversible electrical motor of said power driven antenna unit in one condition of energization of said relay coil and to said down field winding of said motor in the other condition of energization of said relay coil.

13. A solid state current sensor and controller circuit in accordance with claim 12 including a diode connected between the control electrode of said output control transistor and the output terminals of said operational amplifier, said diode poled to permit base current drive for said control transistor to flow through said amplifier to be returned to the other side of said potential source when a signal voltage, which is developed across said first resistor upon the energization of said receiver device, is presented to said operational amplifier.

14. A solid state current sensor and cntroller in accordance with claim 12 including a pair of resistors for setting the gain of the operational amplifier, one of which pair of resistors is connected between the said one of the input terminals of the operational amplifier and one side of the first resistor and the other of which pair of resistors is connected between the output terminal of the operational amplifier and the said one input terminal thereof.

15. A solid state current sensor and controller in accordance with claim 13 wherein the said one of the input terminals of the operational amplifier is the inverting input terminals thereof.

16. A solid state current sensor and controller in accordance with claim 13 including a capacitor connected in parallel with said fourth resistor.

17. A solid state sensor and controller in accordance with claim 16, including an additional resistor connected between the output terminal and the supply return terminal of the operational amplifier.

18. A solid state sensor and controller in accordance with claim 17 including a further resistor connected from the other side of said first resistor to the other input terminal of said operational amplifier.

* * * * *